United States Patent [19]

Levkowitch

[11] Patent Number: 5,279,144
[45] Date of Patent: Jan. 18, 1994

[54] INTERNAL BALANCE CALIBRATION SYSTEM AND METHOD

[75] Inventor: Michael Levkowitch, Rishon Lezion, Israel

[73] Assignee: Israel Aircraft Industries Ltd., Lod, Israel

[21] Appl. No.: 872,246

[22] Filed: Apr. 22, 1992

[30] Foreign Application Priority Data

Apr. 28, 1991 [IL] Israel .......................................... 97982

[51] Int. Cl.$^5$ ...................... G01G 23/01; G01M 9/02; G01M 9/06; F16H 21/44
[52] U.S. Cl. ........................................ 73/1 B; 73/147; 74/469; 364/508; 364/571.02; 16/367
[58] Field of Search ........................................ 73/1 B, 1 R, 866.5, 147, 148; 177/50, 244, 25.11, 177/132; 74/110, 469; 364/571.01-571.08, 508; 16/367

[56] References Cited

U.S. PATENT DOCUMENTS

| | | | |
|---|---|---|---|
| 2,672,755 | 3/1954 | Hohner | 73/1 B X |
| 3,455,155 | 7/1969 | Greenberg et al. | 73/147 |
| 3,546,954 | 12/1970 | Ustin | 74/469 X |
| 3,561,264 | 2/1971 | Needham et al. | 73/147 |
| 4,249,624 | 2/1981 | Kuhnle | 73/862.382 X |
| 4,343,373 | 8/1982 | Stadler et al. | 73/1 B X |
| 4,700,566 | 10/1987 | Häfner | 177/DIG. 9 X |
| 4,735,085 | 4/1988 | Meyer | 73/147 |
| 4,957,357 | 9/1990 | Barns et al. | 33/261 X |
| 5,020,357 | 6/1991 | Kovacevic et al. | 248/542 X |
| 5,142,906 | 9/1992 | Smith | 73/168 |

FOREIGN PATENT DOCUMENTS

| | | | |
|---|---|---|---|
| 1137780 | 12/1982 | Canada | 73/1 B |
| 147823 | 11/1962 | U.S.S.R. | 73/147 |
| 504953 | 4/1976 | U.S.S.R. | 73/1 B |
| 523320 | 7/1976 | U.S.S.R. | 73/1 B |
| 527599 | 6/1977 | U.S.S.R. | 73/147 |
| 588476 | 1/1978 | U.S.S.R. | 73/147 |

OTHER PUBLICATIONS

"A Dynamic Calibrating Apparatus for Cross Derivative Experiments"; Conference: International Congress on Instrumentation in Aerospace Simulation Facilities, Shrivenham, England, Sep. 6–8, 1977, (ICI ASF '77, Record, pp. 125-134) by E. S. Hanff.

A. J. Bowker et al., 3 preliminary pages, pp. 1-4 and 6-28, "A Six Component Auto-Levelling Balance Calibration Frame", 58th Semi-Annual Meeting, Supersonic Tunnel Assoc., Ottawa, Canada, Oct. 1982.

B. Fairlie, "A New Approach to Internal Strain-Gauge Balance Calibration", 69th Semi-Annual Meeting, Supersonic Tunnel Assoc., L.A., Calif., May 1988, 5 pages.

H. Buzhang et al., "An Investigation of Methods on Strain Gage Win Tunnel Balance Calibration for C Rig without Repositioning", pp. 1-35 and 37-43, FFA TN 1988-06, The Aeronautical Res. Inst. of Sweden.

G. I. Johnson, "A New Computer Controlled Rig for Calibration of the T 1500 Wind Tunnel Balances", 71st Meeting, Supersonic Tunnel Assoc., Apr. 1989, University City, Calif., 24 pages.

*Primary Examiner*—Tom Noland
*Attorney, Agent, or Firm*—Cushman, Darby & Cushman

[57] ABSTRACT

A system for calibrating an internal balance used in the testing of scale models in wind tunnels including a base; apparatus for rigidly connecting a first portion of an internal balance to the base; force adaptor apparatus for rigidly engaging a second portion of the internal balance; apparatus for securing the force adaptor apparatus to the base, including apparatus for applying selected loads to the force adaptor apparatus so as to cause a corresponding loading on the internal balance; and low friction apparatus for coupling the force adaptor apparatus to the apparatus for securing, including apparatus for transmitting a direct force from the apparatus for applying selected loads to the force adaptor apparatus via a load point whose position relative to the force adaptor apparatus is substantially constant.

11 Claims, 17 Drawing Sheets

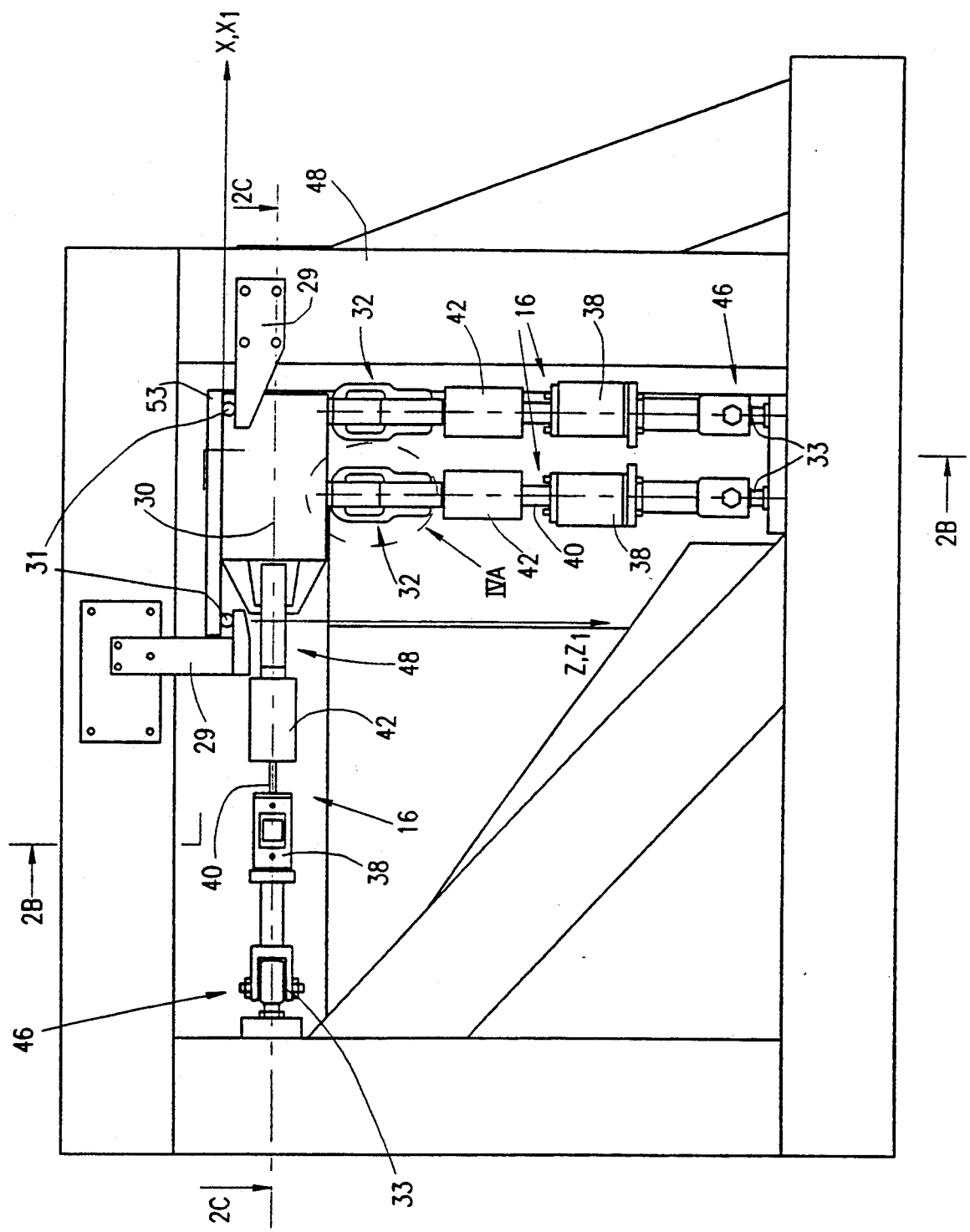

POINT DEVIATIONS

MEASURED Fx vrs. DEAD WEIGHTS

LOADING CONDITIONS.:

FORCES.: Fy = Fz = 20 KG
MOMENTS.: Mx = Mz 0; My = 73 KG*CM

EQUATION COEFFICIENTS:

A0 = .7861016 KG:   A1 = .9990509 KG/KG

LOADING CONDITIONS.:
FORCES..: Fy = 0;  Fz = 170 KG
MOMENTS.: Mx = Mz = 0; My = 475 KG·CM

EQUATION COEFFICIENTS.:
A0 = .7869495 KG:  A1 = .9994746 KG/KG

MEASURED Fx vrs. DEAD WEIGHTS

LOADING CONDITIONS:

FORCES.: Fy = 0; Fz = 420 KG
MOMENTS.: Mx = Mz = 0; My = 1140 KG*CM

EQUATION COEFFICIENTS:

A0 = .6752545 KG;  A1 = 1.000627 KG/KG

POINT DEVIATIONS

POINT DEVIATIONS

MEASURED Fx vrs. DEAD WEIGHTS

LOADING CONDITIONS.:
FORCES..: Fy = 0; Fz = 720 KG
MOMENTS.: Mx = Mz = 0: My = 1940 KG*CM

EQUATION COEFFICIENTS.:
A0 = .4701688 KG:    A1 = 1.001085 KG/KG

LOADING CONDITIONS.:
FORCES..: Fx = Fy = 0 KG
MOMENTS.: Mx = Mz = 0; My = 2.67 * Fz KG*CM

EQUATION COEFFICIENTS.:

A0 = .2412024 KG;   A1 = .9994101 KG/KG

INTERNAL BALANCE CALIBRATION SYSTEM AND METHOD

FIELD OF THE INVENTION

The present invention relates to systems for calibrating internal balances.

BACKGROUND OF THE INVENTION

The use of wind tunnels to test the aerodynamic characteristics of scale models, typically of aircraft, is well known. A model is mounted, via an internal balance or sting balance connected to an aft portion of the model, onto a fixed support. The performance of the aircraft under various simulated wind loading conditions is then examined by taking output readings from the internal balance.

In order to validate any results of wind tunnel testing, however, calibration of the balance prior to testing is required. Calibration of the balance involves mounting it onto a force adaptor, and applying, via the force adaptor, direct forces along and moments about, three predetermined mutually orthogonal axes.

Conventionally, the loading of the balance required for calibration is carried out by use of dead weights, mounted so as to apply forces of known magnitude in known directions. This method is traditionally a manual method and is thus very tedious, taking in the range 100-200 hours to perform. A further disadvantage of this method is that application of a number of different loading conditions simultaneously is limited.

Also known is the repositioning method of calibration, in which the directions of the applied force vectors are kept constant by a servo positioning system. This concept has been put into practice in a system located at the National Aeronautical Establishment Wind Tunnels Center in Canada. In this system, the load application point is levelled automatically in both pitch and roll.

Extension of this concept to a full six degrees of freedom system, as required in an internal balance calibration system, has been found to be very expensive and mechanically very complex. A complete discussion of this system is found in a report entitled 'A Six Component Auto-Leveling Balance Calibration Frame', by R. D. Galway, NAE Canada, Supersonic Tunnel Association, 58th meeting, 1982.

A further approach to the automation of internal balance calibration, known as the Master Balance Method, is by measuring calibration forces by use of another, more accurate balance. This method is free of the size limitations to which the internal balance is subject, and can be manufactured with accurate load cells in a stiff frame which minimizes interaction between forces acting along or about the three axes with respect to which the balance is calibrated. A disadvantage of this approach is the dependence on a further, external calibration system, resulting, inter alia, in a relatively expensive system.

Systems based on this approach have been developed in Germany and in Australia. This approach is discussed in a report entitled 'A New Approach To Internal Strain Gage Balance Calibration', by Bruce Fairlie of the Aeronautical Research Laboratory, Australia, and delivered at the Supersonic Tunnel Association, 69th meeting, 1988.

A non-repositioning approach to internal balance calibration is described in an article entitled 'An Investigation Of Methods On Drain-Gage Wind Tunnel Balance Calibration For A Rig Without Repositioning After Loading', by Han Buzhang, NAI China, Ingmar Johnson, FFA Sweden, and Zhao Lei, SARI China, and published in FFA Technical Notes, 1988-14. A built system is described in a report article entitled 'A New Computer Controlled Rig For Calibration Of The T 1500 Wind Tunnel Balances', by Gustav Ingmar Johnson of The Aeronautical Research Institute Of Sweden, presented at the 71st meeting of the Supersonic Tunnel Association, Apr. 3-4, 1989, Universal City, Calif., U.S.A.

In the non-repositioning approach, applied force vectors are allowed to move and their position relative to the balance axis is measured.

Among advantages of this system are mechanical simplicity, leading to low cost; and long term stability, due to calculation of resultant forces from stable and accurate parameters, facilitated by the use of stable and highly accurate load cells and position sensors.

Among disadvantages of the system built in Sweden, described in the article by Gustav Ingmar Johnson, are: (i) reliance on an assumption that no axial displacements occur in the system, (ii) friction at points where force actuators connect to the force adaptor, and (iii) a lengthy initial adjustment of the force actuators to the coordinate axes of the system.

SUMMARY OF THE INVENTION

The present invention seeks to provide an automated internal balance calibration system of the non-repositioning type, which overcomes disadvantages of known art.

There is provided, therefore, in accordance with an embodiment of the invention, a system for calibrating an internal balance used in the testing of scale models in wind tunnels including a base; apparatus for rigidly connecting a first portion of an internal balance to the base; force adaptor apparatus for rigidly engaging a second portion of the internal balance; apparatus for securing the force adaptor apparatus to the base, including apparatus for applying selected loads to the force adaptor apparatus so as to cause a corresponding loading on the internal balance; and low friction apparatus for coupling the force adaptor apparatus to the apparatus for securing, including apparatus for transmitting a direct force from the apparatus for applying selected loads to the force adaptor apparatus via a load point whose position relative to the force adaptor apparatus is substantially constant.

Additionally in accordance with the invention, the apparatus for transmitting a direct force includes at least one joint assembly including a first joint member mounted in predetermined fixed association with the force adaptor apparatus and having a first linear edge portion; a second joint member having a rounded tip arranged in touching association with the apparatus for securing the force adaptor apparatus, and also having a second linear edge portion; and an intermediate member arranged between and in force transmissive contact with the first and second joint members, and including apparatus for positioning the first and second linear edge portions in opposing, mutually transverse, coplanar positions, such that the first and second linear edge portions combine with the apparatus for positioning to form respective first and second hinge mechanisms defining respective first and second hinge axes intersecting at a single load point whose position relative to the force adaptor apparatus is substantially constant, the first and second hinge mechanisms further being operative to substantially prevent the generation of a frictional force in the apparatus for transmitting.

In accordance with an alternative embodiment of the invention, there is provided apparatus for transmitting a direct force from a first element to a second element including a first joint member mounted in predetermined fixed association with the first element and having a first linear edge portion; a second joint member having a rounded tip arranged in touching association with the second element, and also having a second linear edge portion; and an intermediate member arranged between and in force transmissive contact with the first and second joint members, and including apparatus for positioning the first and second linear edge portions in opposing, mutually transverse, coplanar positions, such that the first and second linear edge portions combine with the apparatus for positioning to form respective first and second hinge mechanisms defining respective first and second hinge axes intersecting at a single load point whose position relative to the first element is substantially constant, the first and second hinge mechanisms further being operative to substantially prevent the generation of a frictional force therein.

Additionally in accordance with the present embodiment, the apparatus for positioning includes first and second generally V-shaped notches, respectively defining intersecting, coplanar first and second linear bottom edges, the notches being wider than and configured for seating the first and second linear edge portions in touching contact with the first and second linear bottom edges, respectively, so as to define therewith the respective first and second hinge mechanisms.

In accordance with yet a further embodiment of the invention, there is provided a method of calibrating an internal balance used in the testing of scale models in wind tunnels including the steps of rigidly connecting a first portion of an internal balance to a base; rigidly connecting a second portion of the internal balance to force adaptor apparatus; securing the force adaptor apparatus to the base so as to permit relative movement therebetween; and applying selected loads to the force adaptor apparatus so as to cause a corresponding loading on the internal balance, including the step of transmitting the loads to the force adaptor apparatus, in a low friction manner, via a plurality of load points whose positions relative to the force adaptor apparatus is substantially constant.

Additionally in accordance with the method of the invention, loading of the force adaptor apparatus causes movement thereof relative to the base, and the method also includes the step of measuring in real-time the movement of the force adaptor apparatus relative to a known starting position, thereby enabling the evaluation of resultant forces acting on the internal balance.

BRIEF DESCRIPTION OF THE DRAWINGS

The present invention will be more fully understood and appreciated from the following detailed description, taken in conjunction with the drawings, in which:

FIG. 2A, is a more detailed front view of the system of FIG. 1;

DETAILED DESCRIPTION OF THE INVENTION

Figure 1:
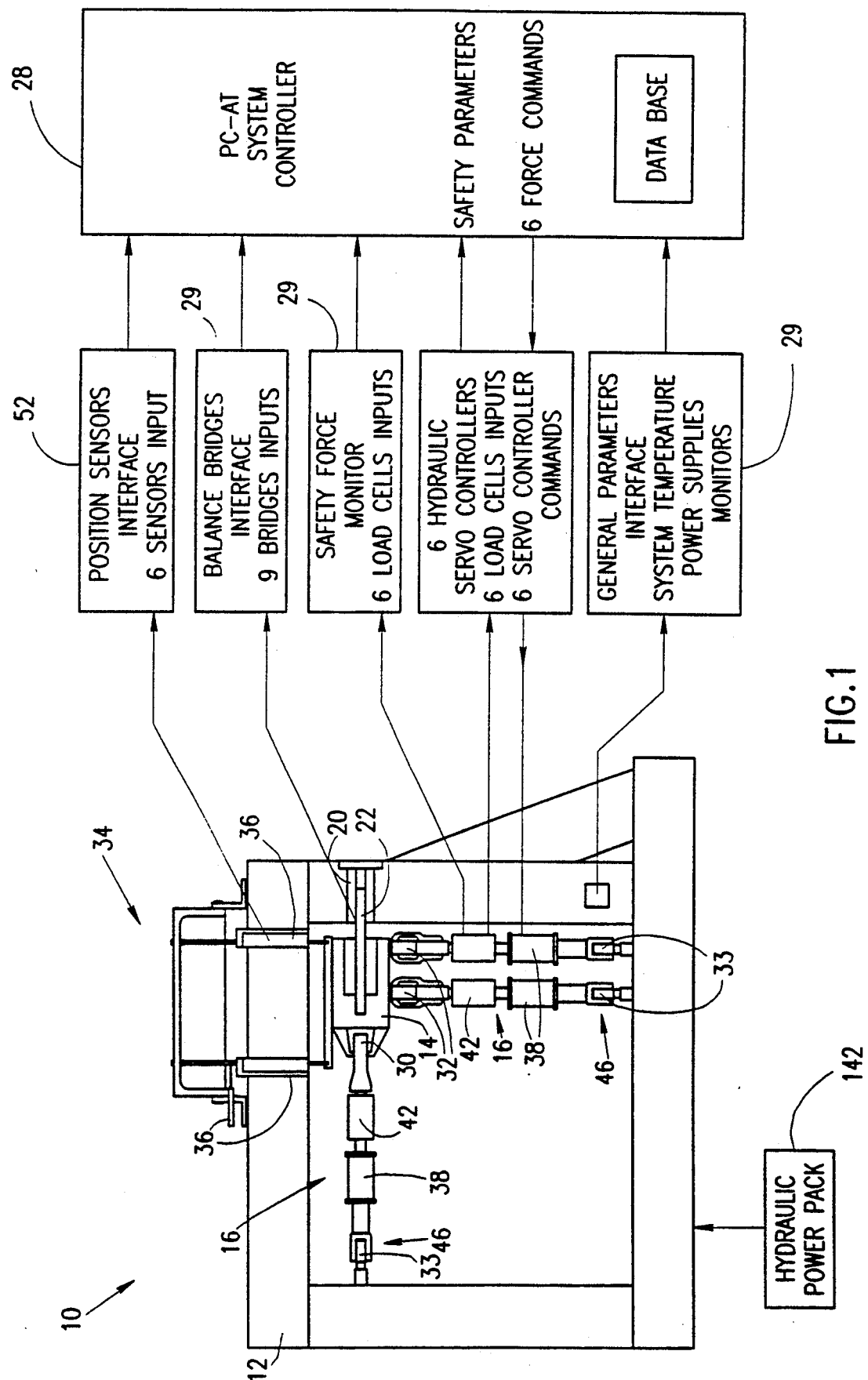
FIG. 1 is a block diagram representation of the internal balance calibration system of the present invention.

Reference is now made to FIG. 1, which is a schematic representation of an internal balance calibration system, referenced generally 10, constructed and operative in accordance with the present invention.

Figure 2B:
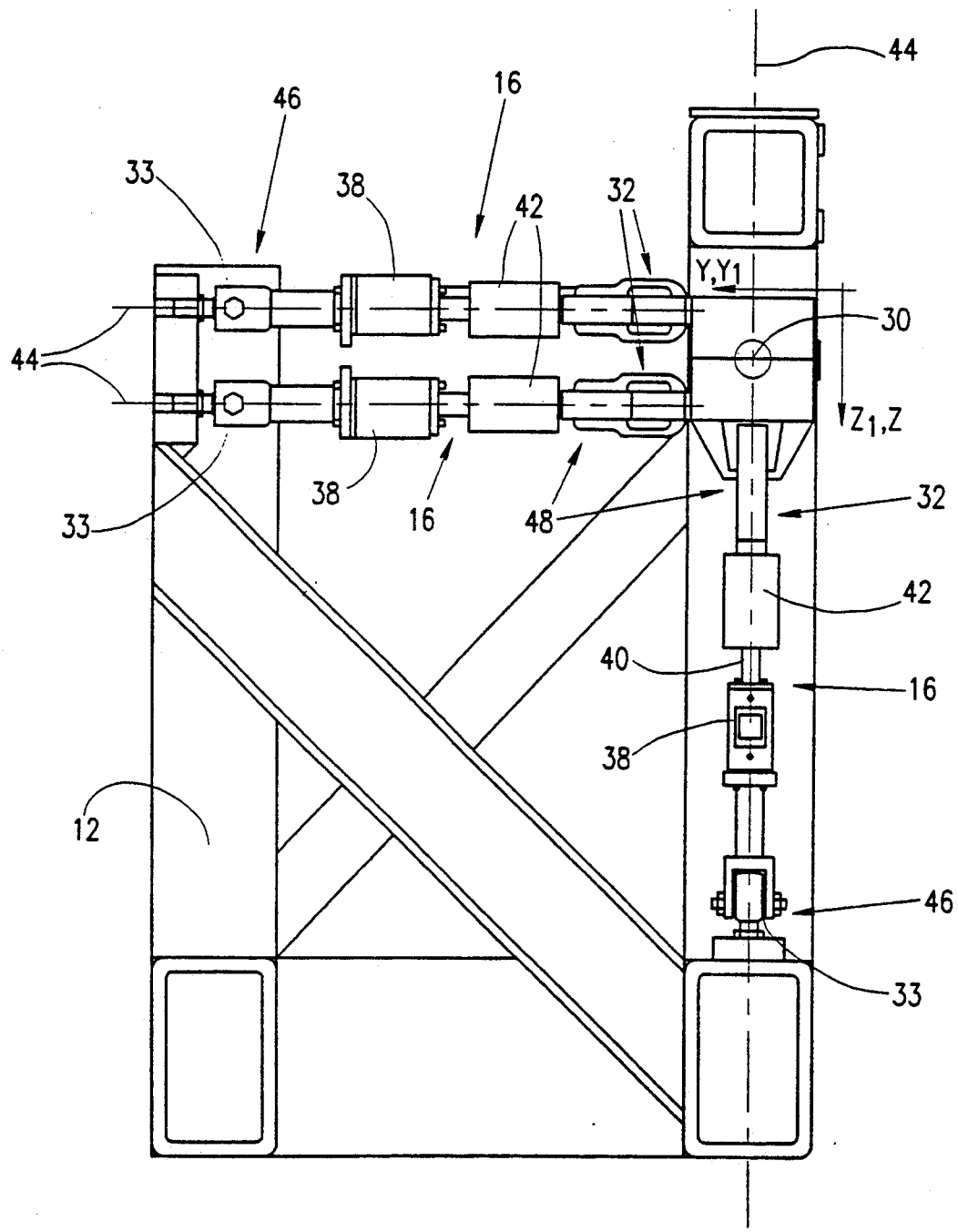
FIGS. 2B and 2C are sectional views of the system shown in FIGS. 1 and 2A, taken respectively along lines 2B—2B and 2C—2C in FIG. 2A.
Figure 2C:
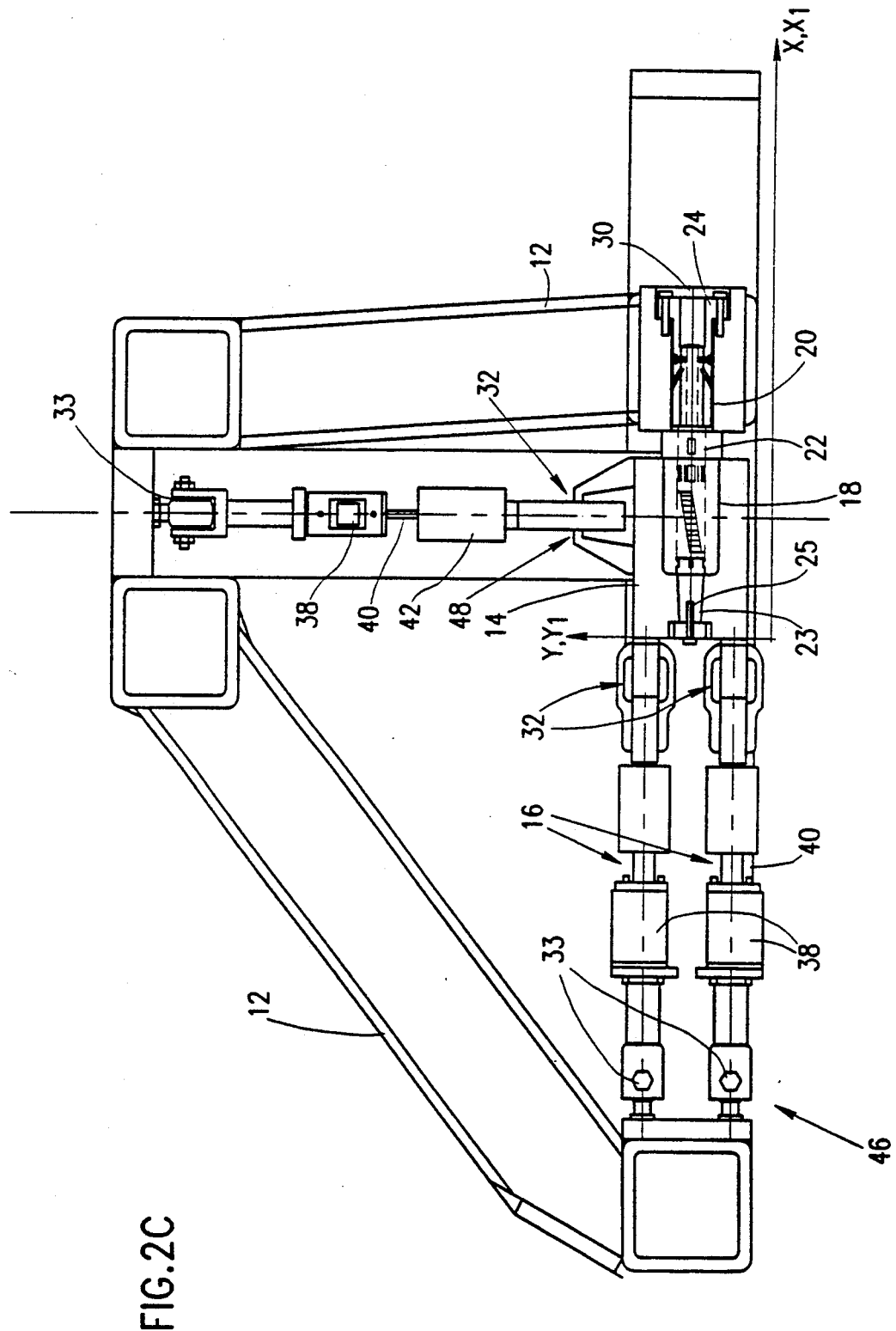

Calibration system 10 includes a rigid frame 12, preferably experiencing deflections of less than 0.01 mm under maximum operating forces. A force adaptor 14 is mounted onto frame 12 via three pairs of force generator/sensor units 16 aligned along respective X, Y and Z axes as shown in FIGS. 2A–2C and in FIG. 10. Units 16 are shown and described in greater detail hereinbelow in conjunction with FIGS. 2A–2C.

Figure 3:
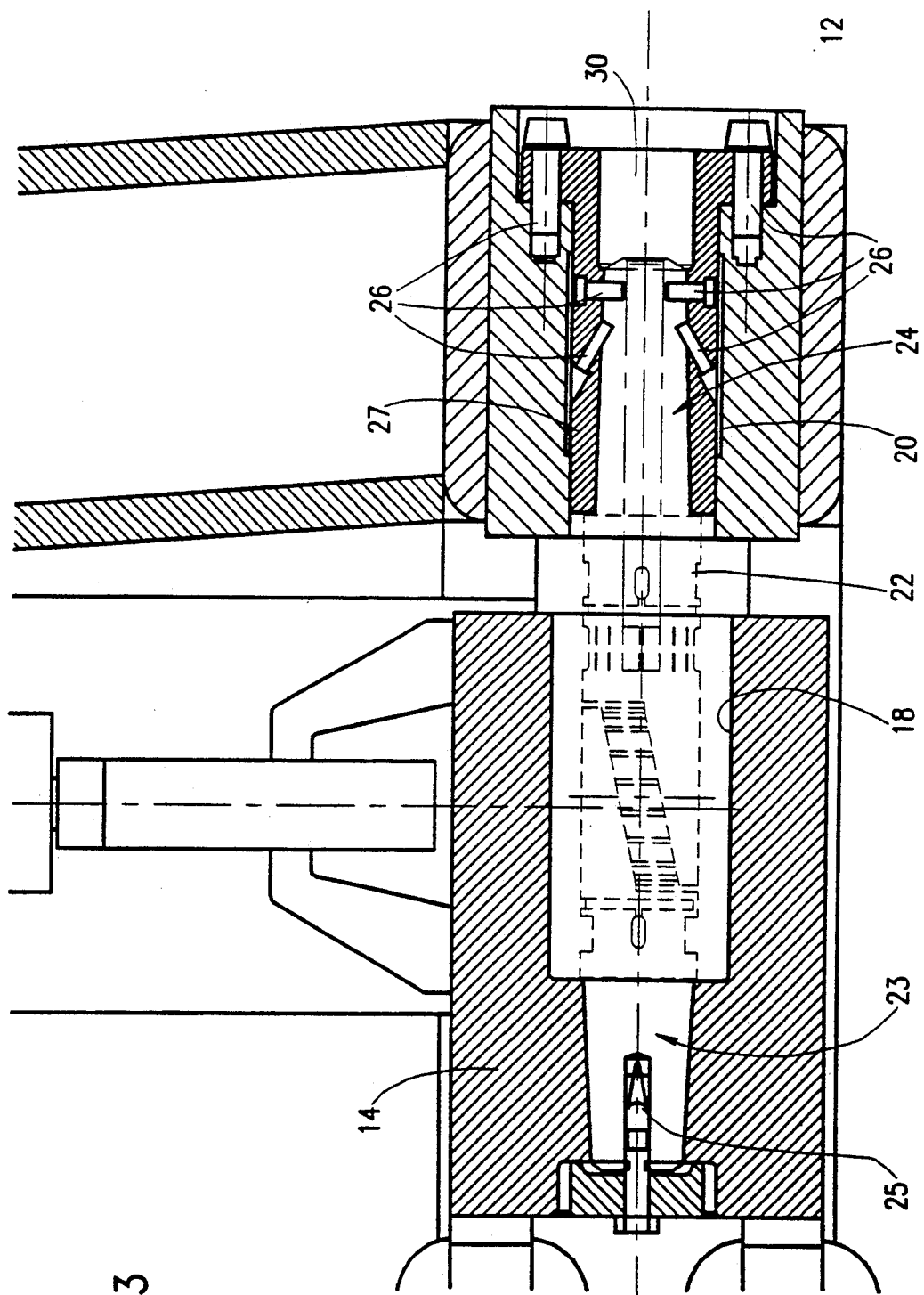
FIG. 3 is an enlarged detailed cross-sectional view illustrating the mounting of the internal balance in the system of FIGS. 1–2C.
Figure 4B:
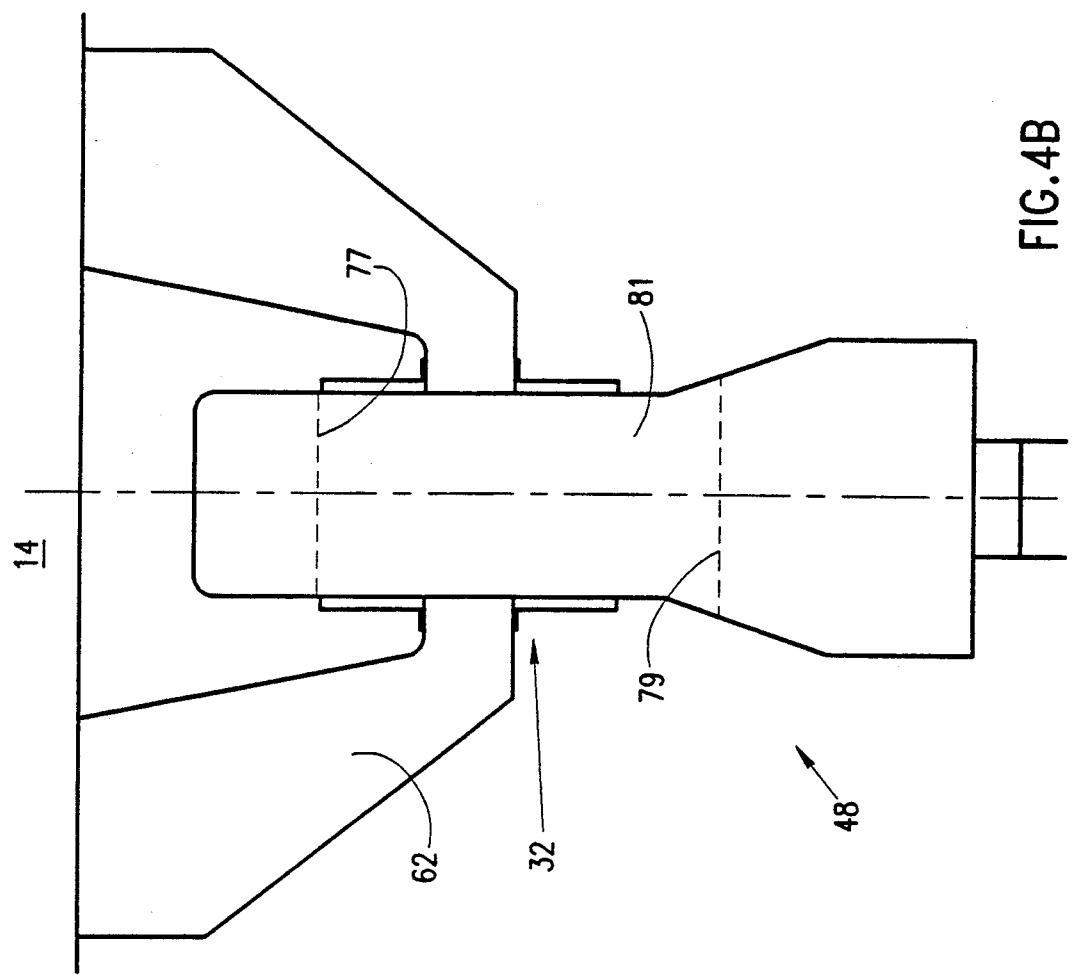
FIG. 4B is a view of the force coupler illustrated in FIG. 4A, taken at right angles thereto.
Figure 4A:
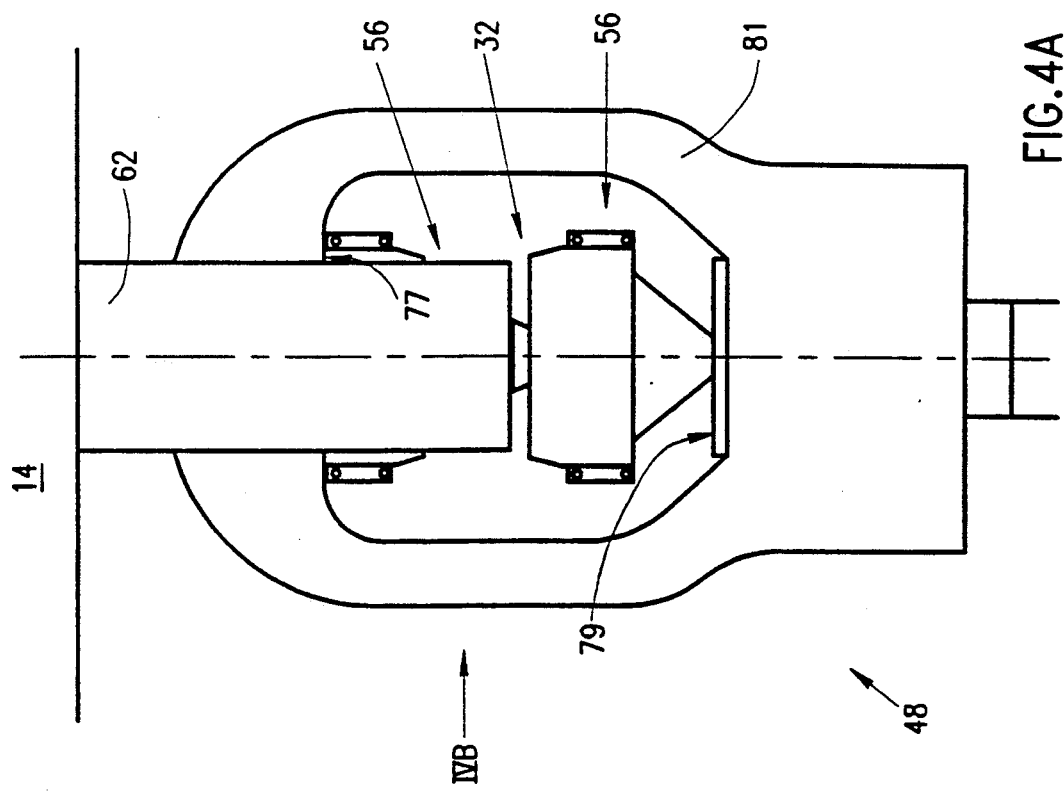
FIG. 4A is an enlarged view of a force coupler employed in the system of the invention, taken at location IVA in FIG. 2A.

Referring now to FIGS. 2C and 3, force adaptor 14 defines an opening 18 aligned with a corresponding opening 20 in frame 12, through which a conventional internal balance 22 extends. The internal balance 22 defines first and second ends, respectively referenced 23 and 24. First end 23 is rigidly secured to force adaptor 14 via a retaining screw 25. Second end 24 of the balance extends into a conventional internal balance adaptor 27, and is secured to the adaptor 27 and to the frame 12 by a plurality of fasteners referenced 26 (FIG. 3).

With additional reference to FIG. 1, in general terms, the calibration of balance 22 requires, inter alia, applying force vectors thereto via force generator/sensor units 16 and force adaptor 14; resolution of the applied force vectors with relation to an axial system (X1, Y1, Z1) defined by the force adaptor 14 and in relation to which the balance 22 is fixed, and determining the forces and moments applied to balance 22; the provision of electrical output signals from the balance 22, in response to application thereto of force vectors; and the calculation of a coefficients matrix for use in wind tunnel testing of scale models with the balance 22.

The calibration system thus includes a suitable system controller 28, such as a PC-AT, for performing, inter alia, the following functions:

operating the force generator/sensor units 16 to apply controlled forces and moments to the force adaptor 14 and, therefore, to balance 22;

resolving the applied forces and moments with relation to the X1,Y1,Z1 axial system of force adaptor 14 and balance 22;

receiving output signals from the balance 22; and calculating a coefficients matrix for balance 22.

In accordance with an embodiment of the present invention, controller 28 includes and analog/digital interface, for example a 20 channel 14 bit A/D, which is operative to receive output signals, via predetermined analog signal conditioners 29, from balance 22 (nine inputs), load cells (six inputs), reference 42 (FIGS. 1-2C), and various other sources providing general system parameters, including power supply (two inputs) and temperature (one input). In the present example, two channels serve as spare or back-up channels. Calibration of the signal conditioners is carried out in a semiautomatic mode using a IEEE-488 interface.

Referring now particularly to FIG. 2A, typically three rigid mounting members 29 (one is hidden) are fixed to frame 12 by any suitable means. A plurality of spherical support elements or balls 31 are provided in predetermined positions on mounting members 29, so as to support force adaptor 14, via a rigid plate member 53, attached thereto, in a repeatable datum or start-up position, prior to installation of balance 22 and application of forces to the force adaptor 14.

It has been found that the supporting of force adaptor 14 on three balls, (one is hidden) in the manner illustrated, provides a datum position that is repeatable within an accuracy of 2-3 microns. When the balance 22 is installed in the force adaptor, therefore, as described, the position of the balance 22 relative to the frame 12, is known.

Each force generator/sensor unit 16 is connected to force adaptor 14 via force couplers 32 shown and described in detail below in conjunction with FIGS. 3A-4B, so as to define a double knife-edge connection between units 16 and force adaptor 14. As will be appreciated from the ensuing description of the force couplers, when forces are imposed on the force adaptor, limited relative movement is permitted to occur between units 16 and the force adaptor 14, and thus balance 22, and it is necessary, therefore, to resolve the known applied forces with respect to the new position of the force adaptor 14 and, therefore, of the balance axis 30.

In order to perform the described resolution of the applied forces, it is required to know first, the point at which a force is applied by each generator/sensor unit 16 to the force adaptor, relative to a predetermined system of axes defined by and, second, the new position of the force adaptor, thereby giving the new position of the longitudinal axis 30 of the internal balance 22.

The transmission of a pure force, at a point whose location is to be accurately determined, from each unit 16 to the force adaptor 14 is dependent on the means by which the unit 16 is coupled to the force adaptor 14. It will be appreciated by persons skilled in the art that the use of bearings or couplers of many known types would cause an error due to frictional forces originating therein. For example, if a normal force of 1000 kg is applied via a force coupler having a friction coefficient of 0.001 in the normal direction, a 1 kg frictional force will result in the axial direction of the balance, resulting overall in a 1% error in the axial parameter.

As described in greater detail hereinbelow in conjunction with FIGS. 4A-6B, force couplers 32 are constructed so as to concentrate an applied force on a measurable point in a known plane, and so as to transmit the force in a virtually frictionless manner. The use of force couplers 32 thus enables the determination of the point at which a force is applied by each generator/sensor unit 16 to the force adaptor 14, relative to the predetermined frame coordinate system.

In order to measure the displacement of the force adaptor 14 from its known start-up position, there is provided a measuring system, referenced generally 34 which, by employing six position sensors 36 associated with controller 28, permits the accurate determination, in real time, of the position of force adaptor 14, and, therefore, of the position of the longitudinal 30 axis of internal balance 22.

Referring now to FIGS. 2A-2C, each force generator/sensor unit 16 includes a suitable force generator 38 connected, via a rigid rod element 40, with a suitable load cell 42, along a longitudinal axis 44, parallel to its associated X, Y or Z axis. Each unit 16 has first and second ends, respectively referenced 46 and 48. First ends 46 are connected to frame 12 via conventional couplers or rod ends 33, while second ends 48 are connected to force adaptor by force couplers 32, constructed in accordance with the present invention.

The force generators 38 are typically servo controlled double-acting hydraulic actuators, and are controlled by controller 28 via a servo controller unit 50 (FIG. 1). Unit 50 employs any suitable servo controllers, although suitable servo controllers are type p/n 2116-222, manufactured by Datum Inc., of Anaheim, Calif., U.S.A.

The load cells 42 may be any load cells having, inter alia, suitable capacities and sufficiently high accuracies. Typical load cells suitable for use in the present system are 2,000 lb, 1,000 lb and 250 lb load cells having 0.03% accuracy and having a dual bridge configuration, such as manufactured by Sensotec Inc. of Columbus, Ohio, U.S.A. A dual bridge configuration is preferred, as one bridge is used by the servo-controller unit 50 (FIG. 1) to control an associated actuator, while the second bridge is used to provide force readings to system controller 28 (FIG. 1). The second bridge is also used as a safety monitor.

Reference is now made to FIGS. 4A-6B, in which force couplers 32 are shown in detail. As described above, in conjunction with FIGS. 2A-2C, force couplers 32 are constructed so as to transmit from force generator/sensor units 16 to force adaptor 14 direct forces at known points.

Each force coupler 32 includes a pair of joint assemblies 56 rigidly mounted in and coupled to respective corresponding recesses 58 (FIG. 5) formed in opposite sides of a portion 60 of a mounting member 62 in a back-to-back arrangement. Mounting member 62 is rigidly mounted onto force adaptor 14, as by being bolted thereto, such that a force vector applied to mounting member 62 is also applied to force adaptor 14. Each joint assembly is typically manufactured from a suitably hard steel, and has an intersecting double-blade and point construction so as to concentrate a force applied thereto at a known point in a known plane.

Figure 5:
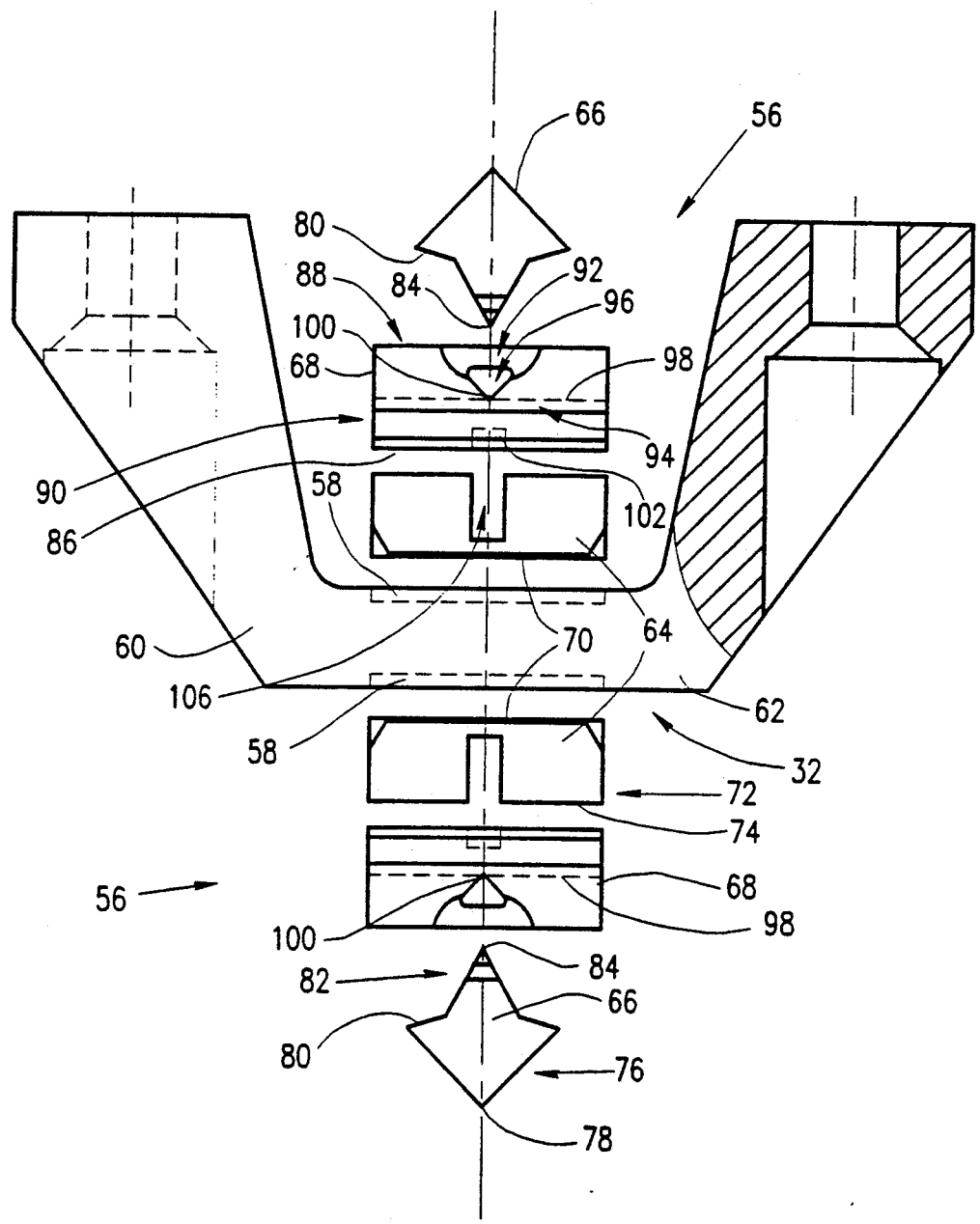
FIG. 5 is a cut-away exploded view of a portion of the force coupler illustrated in FIG. 4B.
Figure 6A:
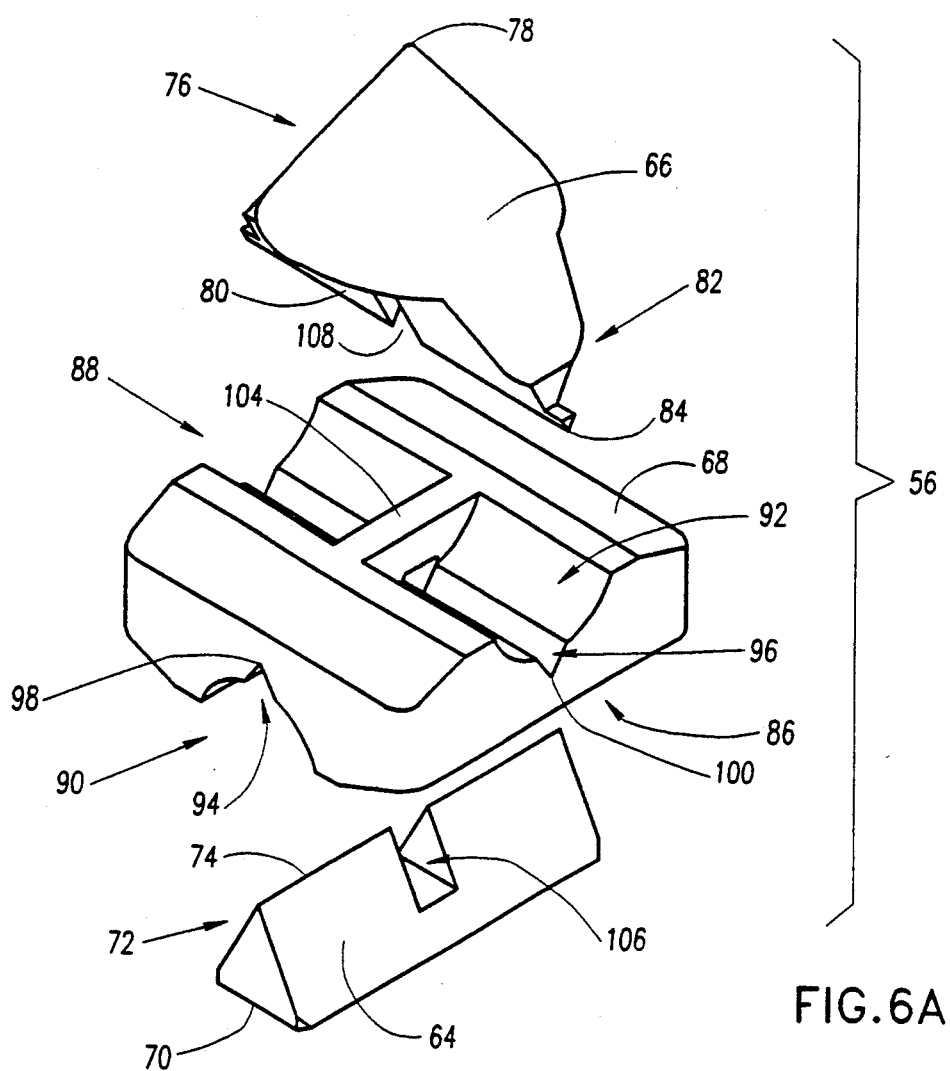
FIGS. 6A and 6B are respective isometric exploded and assembled views of a joint assembly employed in the coupler illustrated in FIGS. 4A–5.
Figure 6B:
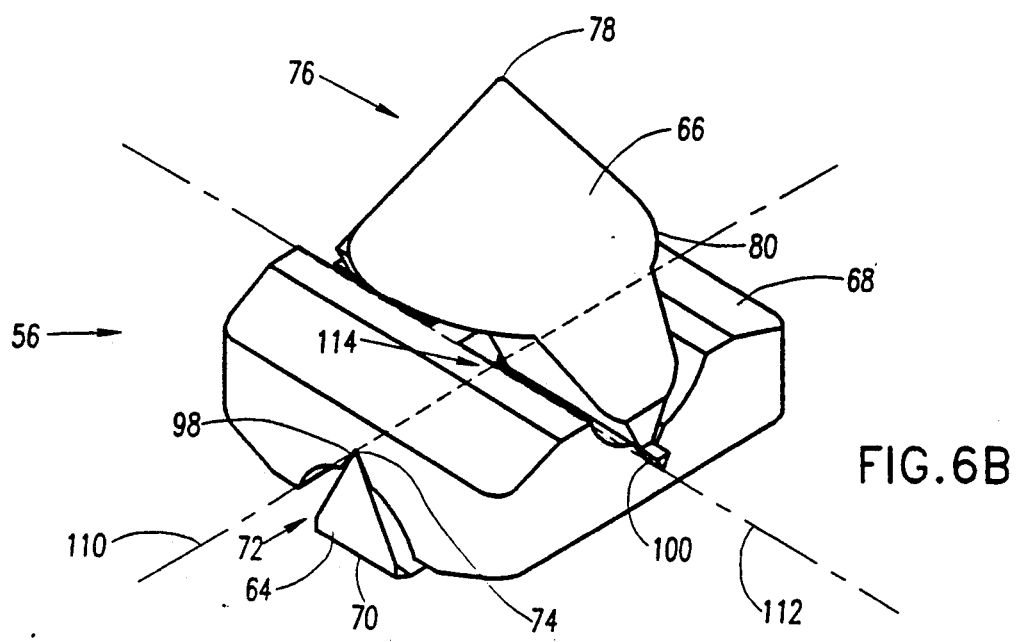

Accordingly, and referring particularly to FIGS. 5-6B, each joint assembly includes a first joint member 64; a second joint member 66; and an intermediate member 68, configured for mounting edge portions of the first and second joint members in a coplanar arrangement.

First joint member 64 is typically triangular cross-section and has a generally rectangular base 70, rigidly mounted, as by bonding, in an associated recess 58, and further has a ridge portion 72 defining a first linear edge 74 parallel to base 70 and forming the apex of the triangle.

Second joint member 66 has a generally conical portion 76 defining a rounded tip 78, and further defining a generally rounded base edge 80. Second joint member 66 further has a ridge portion 82 defining a second linear edge 84, generally parallel to the rounded base edge of the conical portion 76.

The two second joint members 66 in each force coupler 32, are mounted adjacent to first and second inward facing surfaces, respectively referenced 77 and 79 of a closed harness member 81 (FIGS. 4A and 4B) via which the force coupler 32 is connected to an associated force generator/sensor unit 16 (FIGS. 1-2C).

When a pulling force is applied to force adaptor 14, the force is transmitted from member 81 via first surface 77 thereof, through rounded tip 78 of an adjacent second joint member 66 and via the remainder of the joint assembly to an associated recess 58 of the mounting member 62.

When a pushing force is applied to force adaptor 14, the force is transmitted from member 81 via second surface 79 thereof, through rounded tip 78 of an adjacent second joint member 66 and via the remainder of the joint assembly to an associated recess 58 of the mounting member 62.

Intermediate member 68 has generally parallel first and second surfaces, respectively referenced 86 and 88, having formed therein respective back-to-back first and second mutually perpendicular elongate notches, referenced 90 and 92. The elongate notches define respective first and second mutually perpendicular, generally V-shaped trough portions, 94 and 96, having first and second linear, coplanar bottom edges, respectively referenced 98 and 100.

The first and second elongate notches are formed so as to define respective bridging portions 102 (FIG. 5) and 104 (FIG. 6A), which cross their respective associated notches at right angles, and which are configured to interlock with respective first and second transverse notches, referenced 106 and 108 (FIG. 6A), formed in first and second linear edges, 74 and 84, of the first and second joint members, 64 and 66.

When each joint assembly is assembled, therefore, its three constituent members contact along the following edges:

first joint member 64 to intermediate member 68, along first linear edge 74 and first linear bottom edge 98, defining a first hinge axis 110 (FIG. 6B); and intermediate member 68 to second joint member 66, along second linear bottom edge 100 and second linear edge 84, defining a second hinge axis 112 (FIG. 6B), intersecting at right angles with first hinge axis 110 at a point 114 (FIG. 6B).

Point 114 constitutes a point in space whose location is fixed relative to the force adaptor 14 and balance 22, and which thus constitutes a load point, i.e. a point at which a force is applied to force adaptor 14 and thus to balance 22.

In order to determine the precise location of a force vector applied to the force adaptor, it is necessary to measure the real-time displacement of the force adaptor due to the applied force, as described hereinbelow in detail in conjunction with FIGS. 7A-9.

Accordingly, when a force is applied by a force generator 38 so as to be transmitted via a specific one of the pair of joint assemblies 56 associated with the force generator, it is applied via either of first or second surfaces 77 and 79 of harness member 81 (FIGS. 4A and 4B) to the rounded tip 78 of a second joint member 66, which then transmits the force from second linear edge 84 to second linear bottom edge 100, defined by intermediate member 68.

Rounded tip 78 inherently defines with its associated contact surface of harness member 81 a connection which has two degrees of rotational freedom and which is able, therefore, to transmit only a direct force. A direct force is thus transmitted from rounded tip 78, and is concentrated at and thus applied to force adaptor 14 at the point in space defined by the intersection of first and second hinge axes 110 and 112. As these axes are specifically hinge axes, as described above, due to the double knife edge construction of the joint assembly 56, substantially no friction is generated therein.

During tests performed on the herein-described calibration system, and whose results are summarized in Appendices I and II, it was found that the overall system accuracy is very high. The test results validate, inter alia, that joint assemblies 56 are virtually frictionless.

Figures 7A, 7B, 7C:
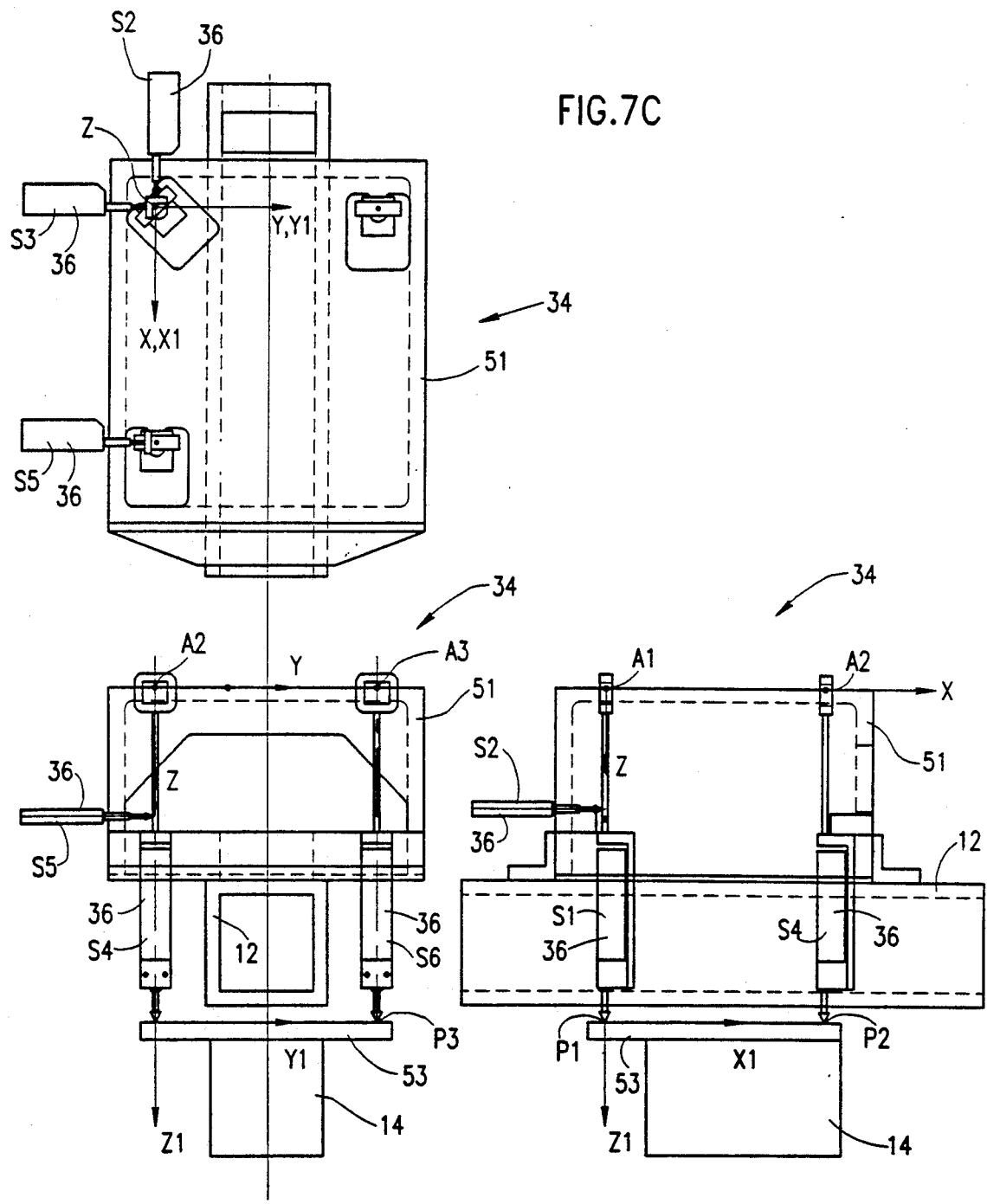
FIGS. 7A, 7B and 7C are respective front, side and top views of a measuring system employed in the system of the invention.

Reference is now made to FIGS. 7A-7C, in which the respective locations of the six position sensors 36 of measuring system 34 are indicated.

The measuring system is an incremental measuring system, employing suitable incremental displacement gages. A suitable gage is the MT25B optical linear displacement gage, manufactured by HEIDENHAIN GmbH, of D-8225, Traunreut, Germany. These gages have an accuracy of 0.2 microns and a resolution of 5 microns. A suitable interface unit between gages 36 and system controller 28 (FIG. 1) is a six channel conditioner, shown schematically at block 52 in FIG. 1, and such as made by DOLI ELECTRONIC GmbH of Germany.

As described in greater detail below, in conjunction with FIG. 10, of the six gages of the measuring system 34 three gages, namely, S1, S4 and S6 are mounted about respective mounting points A1, A2 and A3 defined by a position sensor housing 51 mounted onto frame 12. These three gages are employed to measure the displacement of three predetermined points, labelled P1, P2 and P3 on a rigid plate member 53 secured to the force adaptor 14, relative to the X,Y,Z axial system.

The three remaining gages, namely, S2, S3 and S5, are mounted in various side portions of position sensor housing 51. Gages S2 and S3 are employed to measure the displacement angles of gage S1 in predetermined directions, and gage S5 is employed to measure the displacement angle of sensor S4. The quantities measured by each of the gages is described more fully in conjunction with FIG. 10, below. The output provided by the gages is employed in axes transformation calculations, so as to resolve the forces applied, via the force adaptor, to the balance 22 by the force generator/sensor units 16, with respect to the X1,Y1,Z1 axial system associated with the force adaptor 14 and the balance 22.

Accordingly, the real time monitoring of the forces acting on the balance 22 (FIG. 1) is based on real time processing of the information provided to the system controller 28 (FIG. 1) and, in particular, real time processing of the data provided by the measuring system. The processing of the measuring system output data is described in greater detail hereinbelow, in conjunction with FIG. 10.

It is a particular feature of the invention that the present calibration system takes into account all possible displacements in the system resulting from the application of forces via force generator/sensor units 16. This is in contrast to the system built in Sweden, outlined in the Background Of The Invention, which, ignores axial displacements in the system. It is also noted that the present system employs only six position sensors to produce results considerably more accurate than the Swedish-built system employing eight position sensors.

Initial testing of the presently employed measuring system 34 of the calibration system of the invention, by use of the well known Johnson block gages, showed that the measuring system provides results having an accuracy of 2 microns.

Figure 8:
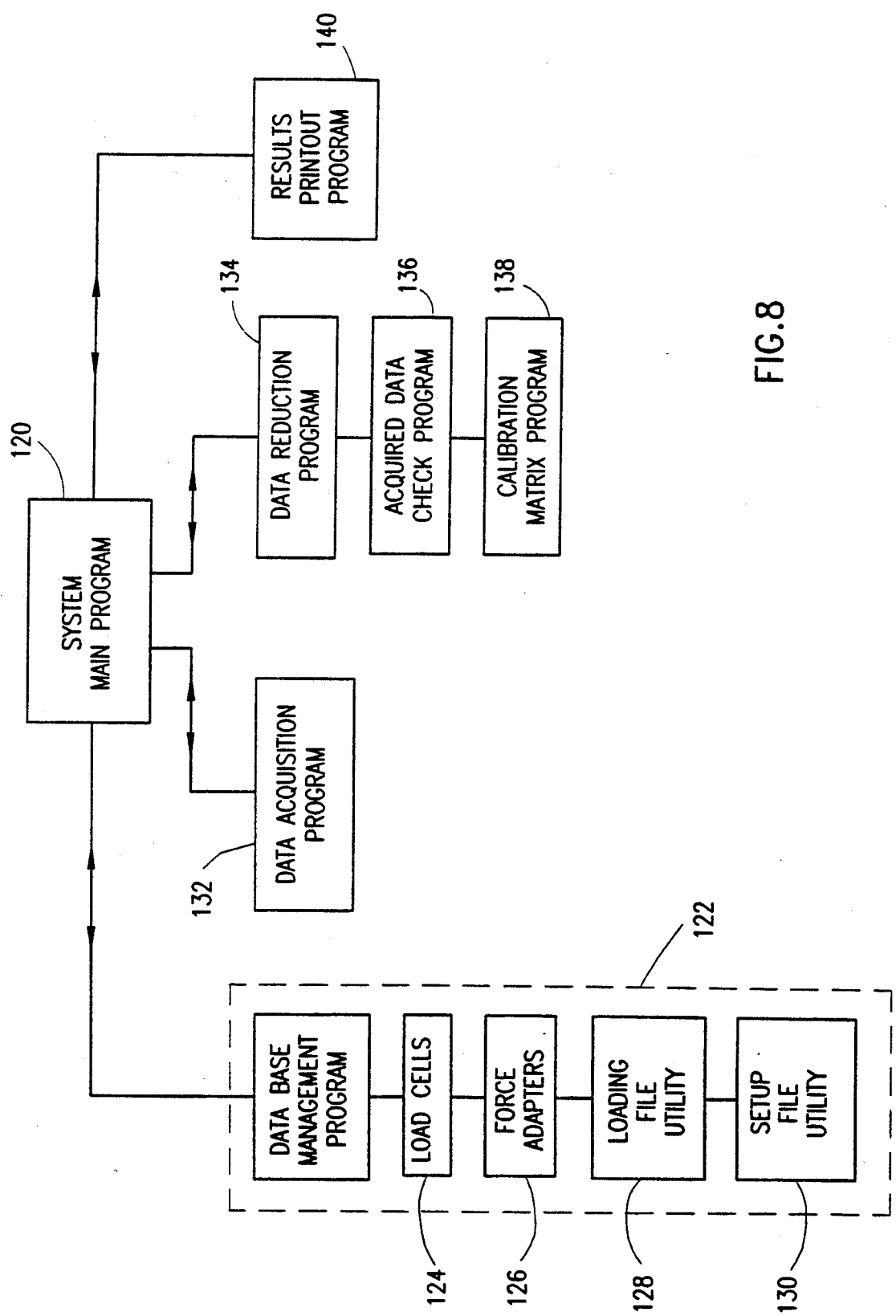
FIG. 8 is a block diagram representation of the software employed in the calibration system of the present invention.

Referring now to FIG. 8, the software employed by system 10, in general, and by controller 28 in particular, includes a main program, indicated at block 120, which operates various other programs used for processing various input data, as described below.

Shown generally at block 122, are various set-up procedures, including a load cell parameter call-up routine 124, in which an operator inputs the type of load cells being used, enabling the controller to call up the parameters relevant to that type of load cell. A force adaptor call-up routine 126 enables the controller to input into the computer the type of force adaptor being used (in accordance with the type of internal balance used), thereby enabling the controller to call up the parameters relevant to that type of force adaptor.

A loading file utility routine 128, prepares a 'points' file, in response to the operator input of loading parameters. The points file stores all the different loading combinations to be applied to the force adaptor and balance during calibration. A setup file utility routine 130 checks the calculated points, or loading combinations, to ensure that no predetermined loading combinations are to be exceeded during calibration, and provides the points file to a main data base from which each loading condition will be selected and applied to the force adaptor and balance, during calibration.

Data acquisition program 132 is operative to gather data from various sensor-type components of the calibration system, namely, the position sensors 36, balance 22, and load cells 42 (FIG. 1).

Data reduction program 134 operates acquired data check program 136, which checks the gathered data for 'rogue' readings, which will be removed from the data to be used, by calibration matrix program 138, for calculating a coefficients matrix for the balance 22. Calibration matrix program 138 also checks the resulting coefficients matrix for 'rogue' readings. The final coefficients matrix is then printed out via a results printout program 140.

Figure 9:
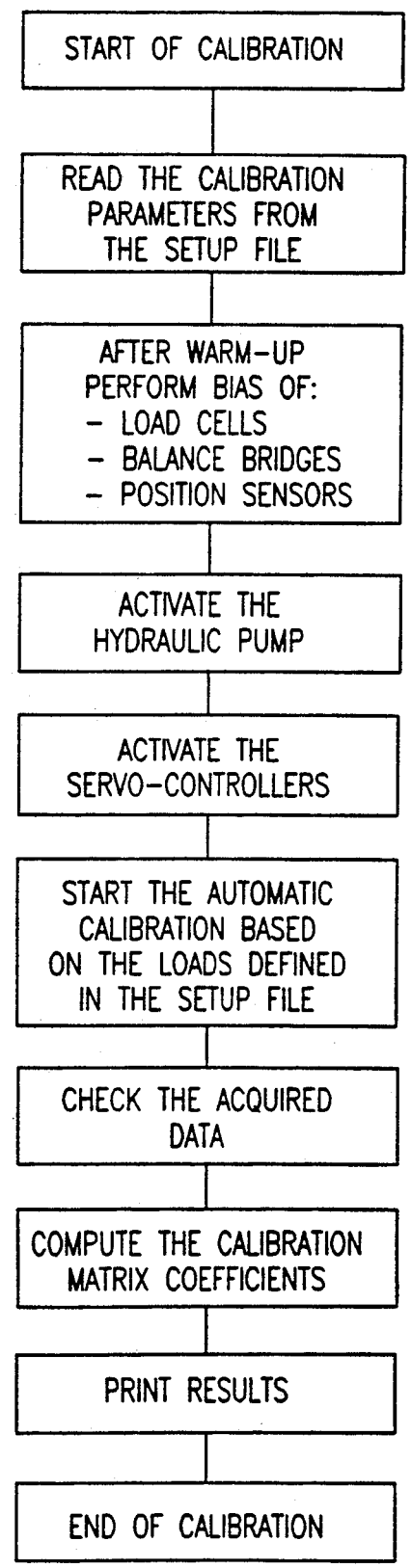
FIG. 9 is a flow chart illustration of operation of the calibration system of the present invention.

Referring now to FIG. 9, there is described a method of calibration using the calibration system of the invention.

As an initial step, the calibration parameters, as generated by the above-described routines 124, 126, 128 and 130 (FIG. 8), are read into the data base. The load cells, balance bridges and position sensors are then biased, subsequent to a warm-up period. The following steps then follow:

Activation of the hydraulic pump 142 (FIG. 1), activation of the servo controllers,
initiation of automatic calibration based on the points file generated by routine 128 (FIG. 8), including data acquisition by program 132 (FIG. 8),
checking of the acquired data by check program 136 (FIG. 8),
computation of the calibration coefficients matrix for the balance, and
providing a hard copy of the computed coefficients matrix.

Figure 10:
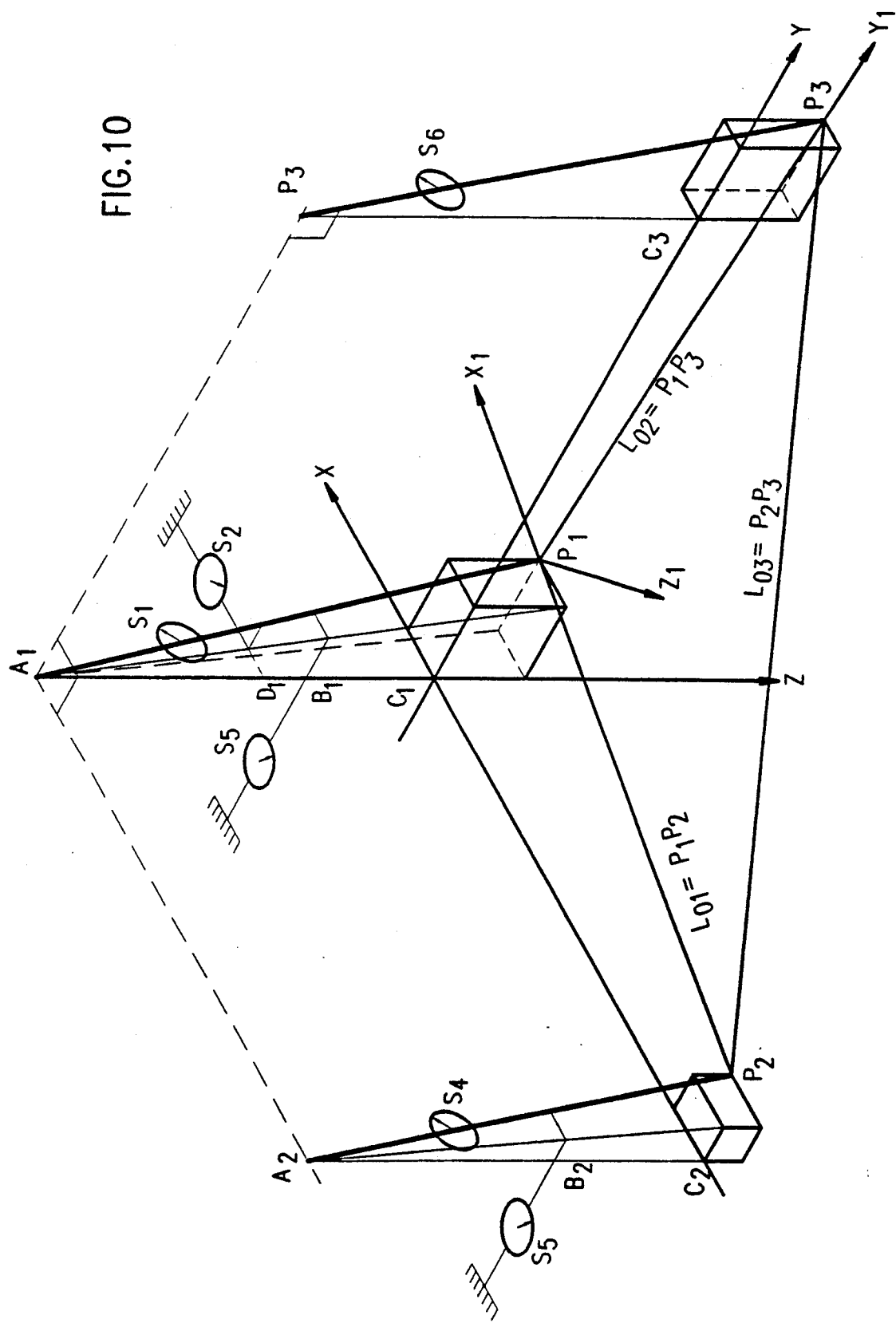
FIG. 10 is a geometrical diagram of the measuring system of FIGS. 7A–7C.
Figure 11B:
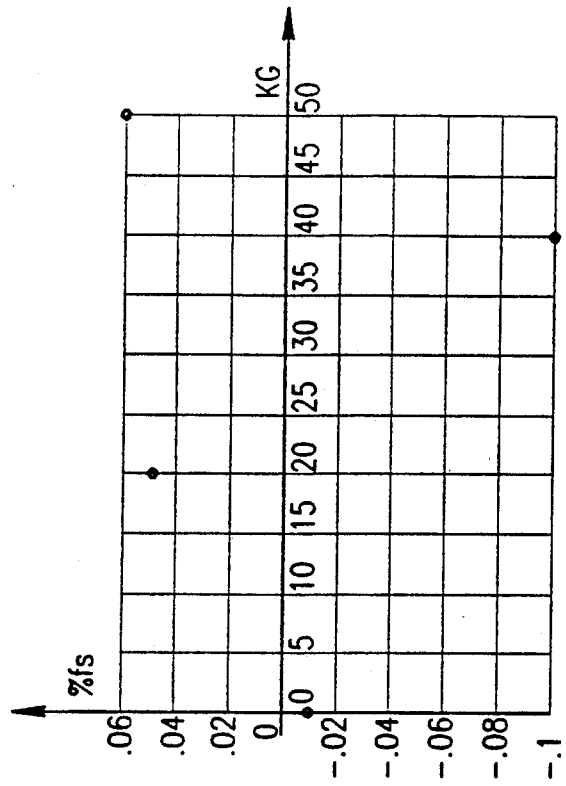
FIGS. 11A–11I are graphs comparing results obtained when checking the calibration system of the invention by use of dead weights.
Figure 11A:
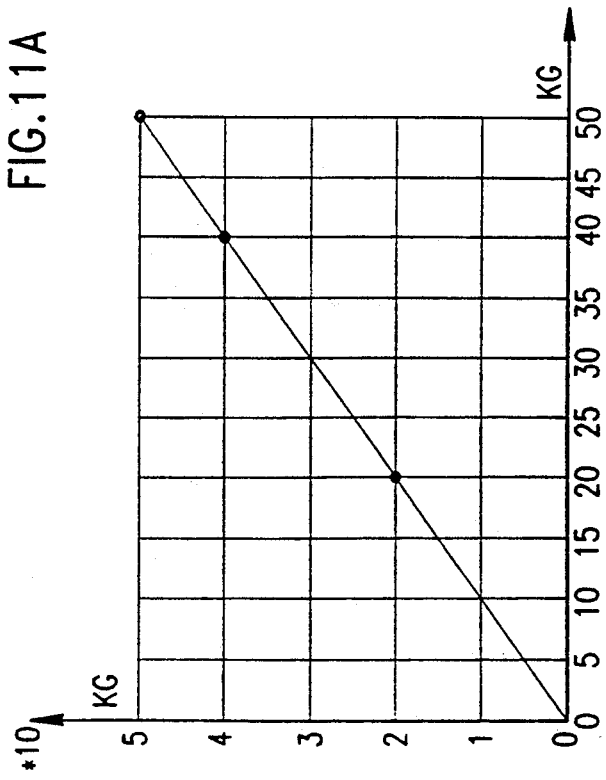
Figure 11D:
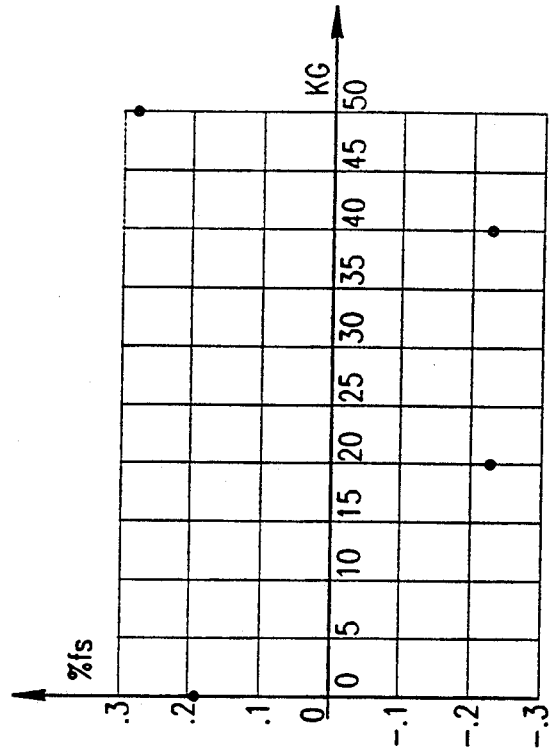
Figure 11C:
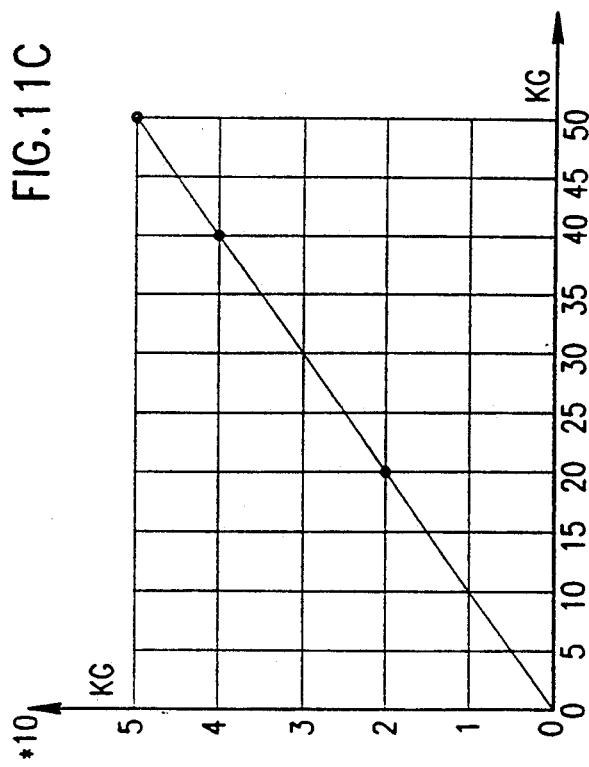
Figure 11E:
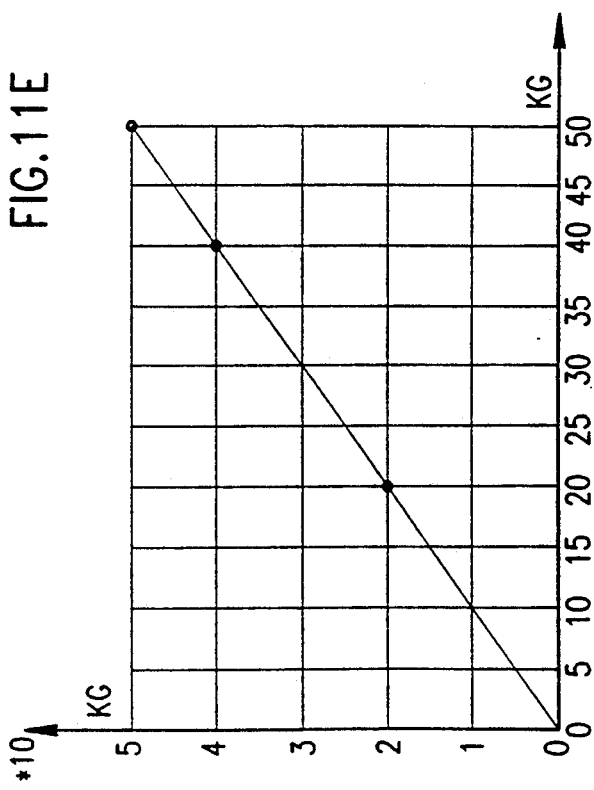
Figure 11F:
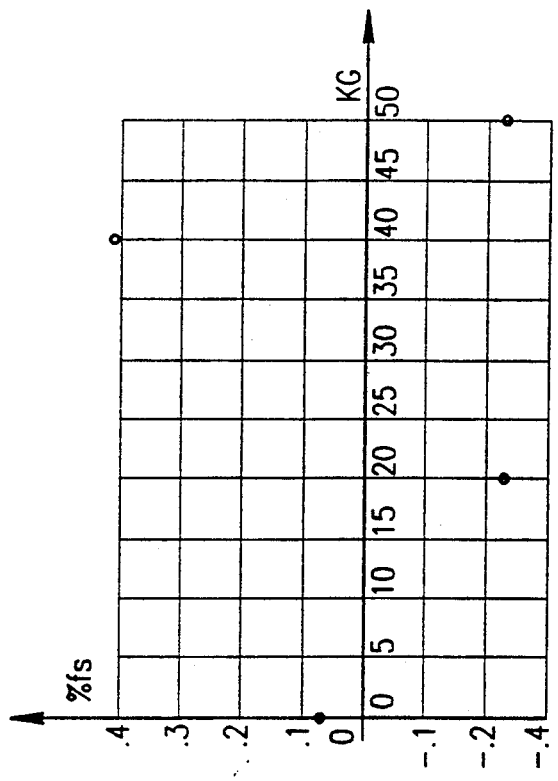
Figure 11H:
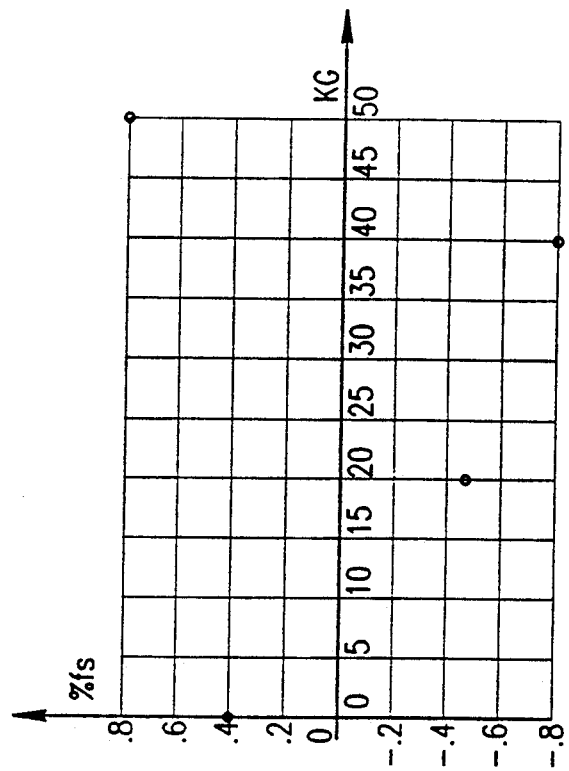
Figure 11G:
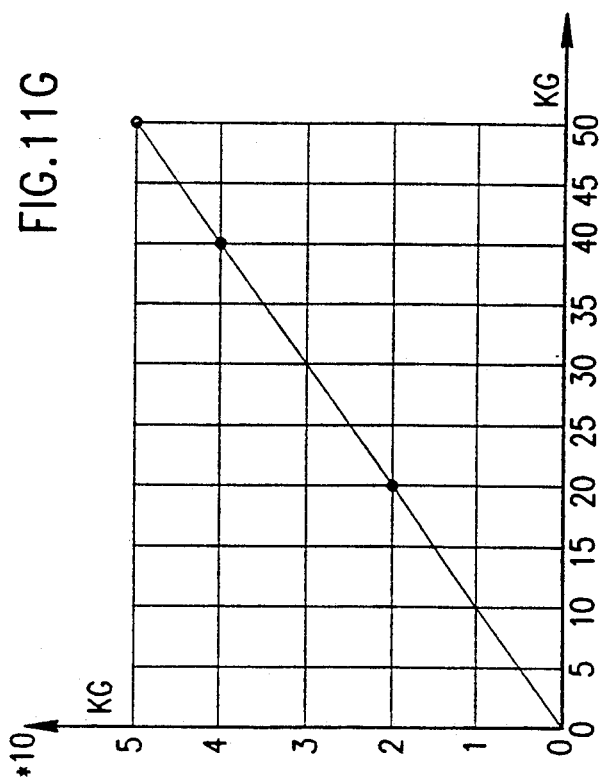
Figure 11J:
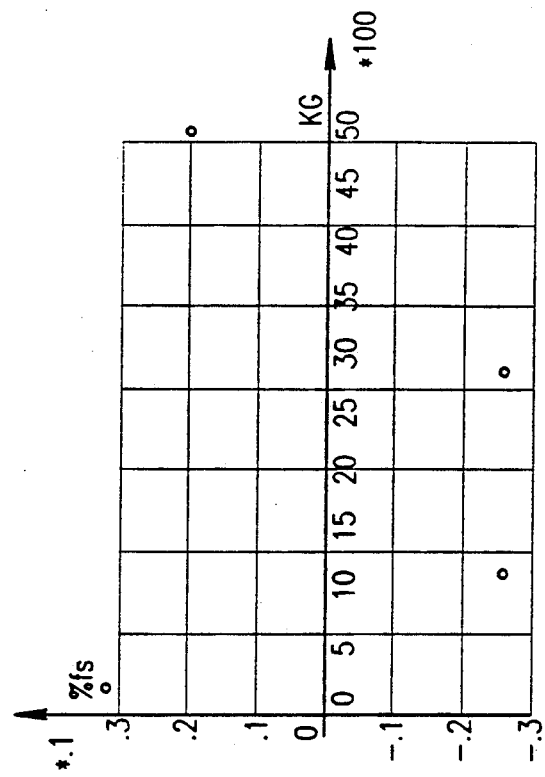
Figure 11I:
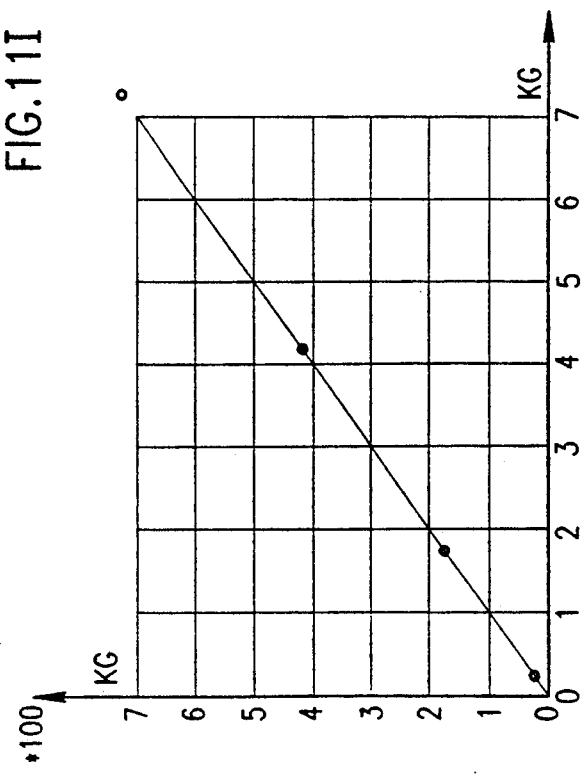

Reference is now made additionally to FIG. 10, in conjunction with which is described a method of measuring the real-time spatial displacement of force adaptor 14, thus enabling the calculation of the displacement of axis 30 of balance 22 and, therefore, the resolution of the force vectors applied by force generator/sensor units 16 with respect to the X1,Y1,Z1 axial system.

It will be appreciated that, the measuring method is based, inter alia, on the direct measurement of preselected angles, thereby facilitating a relatively simple and rapid calculation of the spatial displacement of the force adaptor 14.

The location of a body in space may be defined uniquely by the measurement of any three points on the body. Determination of three such points may be provided by the measurement of three vectors to these points in a predetermined system of axes. If a body is defined, then there may also be defined a system of axes that moves together with that body. When two different systems of axes are known, an axes transformation may be calculated based on the following equations:

$$Pnx = P1x + DCos(1,1)*P1nx + DCos(1,2)*P1ny + DCos(1,3)*P1nz,$$

$$Pny = P1y + DCos(2,1)*P1nx + DCos(2,2)*P1ny + DCos(2,3)*P1nz,$$

$$Pnz = P1z + DCos(3,1)*P1nx + DCos(3,2)*P1ny + DCos(3,3)*P1nz,$$

wherein
Pn is a point in an (X,Y,Z) system of axes,
P1n is the same point but measured relative to a moving system of axes (X1, Y1, Z1),
DCos(i,j) are Direction Cosines, and
P1x, P1y, P1z is the relative displacement between the respective origins of the X1,Y1,Z1 and the X,Y,Z systems.

By using the above equations, the point of connection of each of force generator/sensor units 16 to force adaptor 14 may be calculated in an X,Y,Z axial system defined by the frame 12, and, knowing the forces applied by each of the force generator/sensor unit 16, the force vectors applied to the force adaptor, and thus the resolution of all the force vectors relative to the X1,Y1,Z1 system, and hence the calculation of the various forces and moments acting on balance 22, may be determined.

In the present calibration system, the measurements are performed via the six position sensors 36, shown and described above in conjunction with FIGS. 7A–7C, and labelled S1, S2, . . . S6.

The X,Y,Z system is defined by frame 12 and represents the start-up position of the force adaptor 14. In this position, which is repeatable to within an accuracy of 2–3 microns, the geometrical interrelation between the force adaptor and the force generator/sensor units 16 is known.

The X1,Y1,Z1 system is defined by the force adaptor 14, and coincides with the X,Y,Z system when the force adaptor 14 is in the start-up position.

Referring more specifically to FIG. 10, the position sensors S1 . . . S6 are employed in the following tasks:

Sensor S1—measures the length of vector $A_1P_1$, i.e. the displacement of the origin of system X1,Y1,Z1 relative to the origin of the X,Y,Z system;

Sensor S2—measures angle a1 between vector $A_1P_1$ and the YZ plane by measuring displacement $ds_2$ of a preselected point on vector $A_1P_1$ in the direction of the X axis. This sensor, like the other two angle measuring sensors S3 and S5, are rigidly mounted onto frame 12. Calculation of the angle from the direct measurement is according to the formula:

$$a1 = tg^{-1}(ds2/A_1B_1),$$

where $A_1B_1$ is a predetermined known and fixed distance;

Sensor S3—measures the angle b1 between vector $A_1P_1$ and the XZ plane by measurement of displacement $ds_3$ of a preselected point on vector $A_1P_1$ in the X direction, wherein:

$$b1 = tg^{-1}(ds3/A_1B_1);$$

Sensor S4 measures the length of vector $A_2P_2$;

Sensor S5—measures the angle b2 between vector $A_2P_2$ and the XZ plane by measurement of displacement $ds_5$ of a preselected point on vector $A_2P_2$ in the Y direction, wherein:

$$b2 = tg^{-1}(ds5/A_2B_2);$$

and

Sensor S6 measures the length of vector $A_3P_3$.

It will be appreciated by persons skilled in the art that, an advantage of the present system is its mathematical simplicity, which enables all relevant factors to be taken into account while maintaining real time measurement and calculations.

In terms of actual calculations, determining the three points P1, P2 and P3 (FIGS. 7A–8) is achieved by the following steps:

A. Sensors S1, S2 and S3 provide the measurement of one distance and two angles, thereby enabling unique determination of the size and position of vector $A_1P_1$, and, therefore, point P1.

B. Sensors S4 and S5 establish define point P2, and vector $A_2P_2$. A third measurement is not required as the distance P1P2 is a constant and the second angle of vector $A_2P_2$ is thus dictated thereby. This 'second' angle is calculated using an iterative method, which obviates the need for complicated trigonometric equations.

C. Sensor S6 uniquely establishes the third point P3, and vector $A_3P_3$. An angular measurement of this vector is not required as, in the plane of the force adaptor, one line, i.e. $P_1P_2$, is already defined and the distance therefrom of point P3 is sufficient. The two angles of this vector are calculated, in a program, typically in system controller 28, on the basis of the measurements.

These three points, taken together with the three points $A_1$, $A_2$, and $A_3$, define the three vectors in the X,Y,Z system. The transformation matrix from axes X1,Y1,Z1 to axes X,Y,Z can thus be calculated, thereby enabling calculation of the location in space of the respective positions of the force generator/sensor units 16.

FIGS. 11A–11I are graphs comparing results obtained when checking the calibration system of the invention by use of dead weights.

It will be appreciated by persons skilled in the art that, the scope of the present in invention is not limited to what has been specifically shown and described above by way of example. The scope of the invention is limited, rather, solely by the claims, which follow.

I claim:

1. A system for calibrating an internal balance used in the testing of scale models in wind tunnels comprising:
   a base;
   means for rigidly connecting a first portion of an internal balance to said base;
   force adaptor means for rigidly engaging a second portion of the internal balance;
   means for securing said force adaptor means to said base, including means for applying selected loads to said force adaptor means so as to cause a corresponding loading on the internal balance; and
   low friction means for coupling said force adaptor means to said means for securing, including means for transmitting a direct force from said means for applying selected loads to said force adaptor means via a load point whose position relative to said force adaptor means is substantially constant,
   said means for transmitting a direct force including at least one joint assembly comprising:
   a first joint member mounted in predetermined fixed association with said force adaptor means and having a first linear edge portion;
   a second joint member having a rounded tip arranged in touching association with said means for securing said force adaptor means, and also having a second linear edge portion; and
   an intermediate member arranged between and in force transmissive contact with said first and second joint members, and including means for positioning said first and second linear edge portions in opposing, mutually transverse, coplanar positions, such that said first and second linear edge portions combine with said means for positioning to form respective first and second hinge mechanisms defining respective first and second hinge axes intersecting at a single load point whose position relative to said force adaptor means is substantially constant, said first and second hinge mechanisms further being operative to substantially prevent the generation of a frictional force in said means for transmitting.

2. A system according to claim 1, and wherein said means for positioning comprises:
   first and second generally V-shaped notches, respectively defining intersecting, coplanar first and second linear bottom edges, said notches being wider than and configured for seating said first and second linear edge portions in touching contact with said first and second linear bottom edges, respectively, so as to define therewith said respective first and second hinge mechanisms.

3. A system according to claim 1, and wherein said means for applying selected loads comprises a plurality of force generators for loading said force adaptor means at a plurality of predetermined loading locations, said means for coupling comprises a plurality of couplers for coupling each said force generator to said force adaptor means at each said predetermined loading location, said system also comprising:

a ring-like mounting member rigidly secured to said force adaptor means so as to define an opening therewith, and defining outward-facing, opposing mounting portions for one of said couplers;

each said coupler including:

a ring-like harness member associated with one of said force generators, extending through said opening between said force adaptor means and said mounting member, and surrounding said mounting portions defined thereby, so as to define a pair of inward-facing opposing surfaces, each facing an adjacent mounting portion defined by said mounting member; and a pair of said joint assemblies mounted in a back-to-back arrangement, each being arranged between one of said mounting portions and a facing one of said inward-facing opposing surfaces, such that said a first joint member is rigidly secured to an associated mounting portion and said rounded tip of said second joint member is arranged in touching association with an associated inward-facing surface.

4. A system according to claim 1, and wherein operation of said means for applying selected loads causes movement of said force adaptor means and the second portion of the internal balance relative to said base, and said system further comprises:

means, mounted onto said base, for measuring in real-time the movement of said force adaptor means relative to said base, thereby permitting the evaluation of the resultant forces applied to said force adaptor means and to the internal balance.

5. A system according to claim 4, and wherein said means for applying selected loads comprises a plurality of force generators for loading said force adaptor means at a plurality of predetermined loading locations, said means for coupling comprises a plurality of couplers for coupling each said force generator to said force adaptor means at each said loading location, each said coupler thus transmitting a known force from an associated one of said force generators to said force adaptor means via a load point whose relation to said force adaptor means is substantially constant, and wherein said means for measuring includes:

means for mounting said force adaptor means in a known datum position;

means for measuring in real-time the movement of said force adaptor means relative to said datum position, and for providing output signals in accordance with said movement; and data processing means operative to receive said output signals from said means for measuring so as to enable evaluation of the position of each said load point relative to said base, thereby enabling the calculation of force vectors in preselected directions relative to said force adaptor means and the internal balance, said data processing means further being operative to receive output signals from the internal balance in accordance with loading sensed thereby in said preselected directions relative thereto, thereby enabling the determination of a coefficients matrix for the internal balance.

6. A system according to claim 5, and wherein said means for mounting said force adaptor means in a datum position comprises:

a mounting surface rigidly attached to said base and having a known position relative thereto; and a plurality of mounting elements arranged at predetermined locations on said mounting surface so as to define said datum position, and configured to support said force adaptor means thereat.

7. A system according to claim 6, and wherein said plurality of mounting elements comprises a plurality of rigid spheres.

8. Coupling apparatus for use in a calibration system for an internal balance used in the testing of scale models in wind tunnels, wherein the system includes a base; apparatus for rigidly connecting a first portion of an internal balance to the base; force adaptor apparatus for rigidly engaging a second portion of the internal balance; and apparatus for securing said force adaptor apparatus to said base, including apparatus for applying selected loads to said force adaptor apparatus so as to cause a corresponding loading on the internal balance; said coupling apparatus comprising:

low friction means for coupling said force adaptor apparatus to the apparatus for securing, including means for transmitting a direct force from the apparatus for applying selected loads to the force adaptor apparatus via a load point whose position relative to the force adaptor apparatus is substantially constant, said means for transmitting a direct force including at least one joint assembly comprising:

a first joint member mounted in predetermined fixed association with said force adaptor means and having a first linear edge portion;

a second joint member having a rounded tip arranged in touching association with said means for securing said force adaptor means, and also having a second linear edge portion; and an intermediate member arranged between and in force transmissive contact with said first and second joint members, and including means for positioning said first and second linear edge portions in opposing, mutually transverse, coplanar positions, such that said first and second linear edge portions combine with said means for positioning to form respective first and second hinge mechanisms defining respective first and second hinge axes intersecting at a single load point whose position relative to said force adaptor apparatus is substantially constant, said first and second hinge mechanisms further being operative to substantially prevent the generation of a frictional force in said means for transmitting.

9. Apparatus according to claim 8, and wherein said means for positioning comprises:

first and second generally V-shaped notches, respectively defining intersecting, coplanar first and second linear bottom edges, said notches being wider than and configured for seating said first and second linear edge portions in touching contact with said first and second linear bottom edges, respectively, so as to define therewith said respective first and second hinge mechanisms.

10. Apparatus for transmitting a direct force from a first element to a second element comprising:

a first joint member mounted in predetermined fixed association with said first element and having a first linear edge portion;

a second joint member having a rounded tip arranged in touching association with said second element, and also having a second linear edge portion; and an intermediate member arranged between and in force transmissive contact with said first and second joint members, and including means for positioning said first and second linear edge portions in opposing, mutually transverse, coplanar positions, such that said first and second linear edge portions combine with said means for positioning to form respective first and second hinge mechanisms defining respective first and second hinge axes intersecting at a single load point whose position relative to said first element is substantially constant, said first and second hinge mechanisms further being operative to substantially prevent the generation of a frictional force therein.

11. Apparatus according to claim 10, and wherein said means for positioning comprises:

first and second generally V-shaped notches, respectively defining intersecting, coplanar first and second linear bottom edges, said notches being wider than and configured for seating said first and second linear edge portions in touching contact with said first and second linear bottom edges, respectively, so as to define therewith said respective first and second hinge mechanisms.

* * * * *